United States Patent [19]

Gobeil

[11] Patent Number: 4,774,762

[45] Date of Patent: Oct. 4, 1988

[54] HAND-HELD AUTOMATIC POWER CRIMPER

[75] Inventor: Richard W. Gobeil, Los Angeles, Calif.

[73] Assignee: McDonnell Douglas Corporation, St. Louis, Mo.

[21] Appl. No.: 37,006

[22] Filed: Apr. 10, 1987

[51] Int. Cl.[4] ........................ H01R 43/04; B23P 19/00

[52] U.S. Cl. .......................................... 29/861; 29/751

[58] Field of Search .............. 29/816, 751, 705, 566.1, 29/861; 227/136; 72/410

[56] References Cited

U.S. PATENT DOCUMENTS

| | | | |
|---|---|---|---|
| 3,075,198 | 9/1963 | Over | 29/751 X |
| 3,611,782 | 10/1971 | Eppler | 29/751 X |
| 3,710,610 | 1/1973 | McCaughey | 29/751 X |
| 3,911,712 | 10/1975 | Wustinger et al. | 29/751 X |
| 4,173,067 | 11/1979 | Steiner et al. | 29/816 |

*Primary Examiner*—Howard N. Goldberg
*Assistant Examiner*—Carl J. Arbes
*Attorney, Agent, or Firm*—Beehler, Pavitt, Siegemund, Jagger, Martella & Dawes

[57] ABSTRACT

An automatic pneumatically powered crimping hand tool for making electrical connections is devised by advancing a bandoleer of contact carriers, each contact carrier including a contact, to align one of the contact carriers and contacts in an ejectable position within the tool. Once in the ejectable position, a pneumatically powered ejection pin is then longitudinally advanced into the contact carrier to eject the contact from the contact carrier into a crimping position. Once the contact is placed within the tool in a crimping position, the wire is then manually placed within the contact. The depression of a trigger automatically and serially activates the advancement of the contact carrier and ejection of the contact and then to drive four indentor pins into the electrical contact. The contact is mechanically deformed about the wire. The operation may then be repeated on the next serially connected contact within the bandoleer of contacts. Adjustment may be made within the hand tool with respect to the extent of crimping motion to regulate the degree of indentation both with respect to the gauge of the contact and the gauge of the wire to be crimped.

19 Claims, 6 Drawing Sheets

HAND-HELD AUTOMATIC POWER CRIMPER

BACKGROUND OF THE INVENTION

1. Field of the Invention

The present invention relates to the field of power hand tools and more particularly to a powered hand tool for making crimped electrical contacts.

2. Description of the Prior Art

During the construction of an aircraft, particularly military aircraft carrying a substantial amount of electronic equipment and other electrically activated or powered devices, thousands of electrical lines must be laid out within the aircraft and electrical connections made with the electronic equipment and devices. Therefore, thousands of wire-to-wire electrical connections must be made within a single aircraft or vehicle during its production. Conventional soldering techniques thus become prohibitively slow and expensive. Therefore, the electrical connections must be made mechanically, typically by crimping a contact.

The tool by which such mechanical connections are made must be easily hand held so that it may be used at the site of wire harness fabrication.

Hand-held manually powered electrical crimping tools are well known and are typically employed in such instances. While such manually powered tools produce acceptable crimps in the hands of a skilled operator, are inexpensive, and can quickly and inexpensively make the electrical connection, the possibility of human error in the use of the tool, affecting the quality of the connection, and the possibility or eventuality of simple fatigue in the prolonged use of such tools by the operator, affecting productivity, is endemic to the aircraft industry.

Production crimping of electrical contacts has been practiced in the aerospace industry for more than 35 years. During this time, numerous improvements in production crimping technology have occurred, starting from single gauge hand-held crimping tools which provided a single indent crimp on a contact barrel to present day bench mounted automatic crimpers which can simultaneously accommodate up to five different contact gauges while producing 8-indent crimps within less than one second.

However, current wire harness production techniques require that over 25% of all the wire contact terminations, such as second end terminations, be completed on the harness form boards. This means that hand-held crimpers must be used.

What is needed is a crimping tool which would virtually eliminate operator fatigue while providing a reduction in man-hours devoted to the production of crimped electrical contacts along with increased work output.

Therefore, what is needed is an automatic power crimper for making electrical connections which can be hand held, which will quickly and inexpensively make uniform high quality electrical contacts.

BRIEF SUMMARY OF THE INVENTION

The invention is a hand-held apparatus for producing a crimped electrical contact onto a wire. The electrical contact is held in a bandoleer of contact carriers which are specifically designed for each size and shape of contact. The invention comprises a hand-held housing, an indexing mechanism for advancing a bandoleer of electrical contacts, an ejection mechanism for ejecting an electrical contact from the bandoleer to place the electrical contact in a crimping position, and a crimping mechanism for crimping the electrical contact when the electrical contact has been ejected from the bandoleer into the crimping position. The crimping mechanism, the indexing mechanism, and the ejection mechanism are each disposed in the hand-held housing. As a result the electrical contact is crimped onto the wire by automatic serial activation of each of the hand-held mechanism.

The invention further comprises a trigger mechanism for serially activating first the indexing mechanism for advancing the bandoleer, then the ejection mechanism for ejecting the electrical contact from the bandoleer, and finally the crimping mechanism for crimping the electrical contact.

The crimping mechanism for crimping the electrical contact comprises a plurality of indent pins, a corresponding plurality of linkage mechanism coupled to the indent pins, and a main pneumatic piston coupled to the linkage mechanism for imparting a force through the linkage mechanism to the indentor pins. The indentor pins contact the electrical contact to crimp the electrical contact about the wire disposed therein.

The invention further comprises a selector mechanism for regulating the amount of movement of the main piston. As a result different gauge wires and contacts are accommodated. The selector mechanism is disposed in the hand-held housing.

The selector mechanism for regulating movement of the main piston further comprises a first mechanism for adjusting movement of the main piston and hence the indentor pins to accommodate different gauges of contacts, and a second mechanism for regulating movement of the main piston and hence the indentor pins to accommodate different gauges of wire to be crimped within the contacts.

The electrical contact to be crimped is axially disposed within the apparatus and the ejection mechanism for ejecting the electrical contact from the bandoleer comprises an eject piston axially disposed within the apparatus, and an eject pin axially disposed within the apparatus. The eject pin extends through the apparatus to contact the electrical contact within the bandoleer. Longitudinal disposition of the eject pin forces the electrical contact from the bandoleer. The eject pin is coupled to the eject piston wherein pneumatic displacement of the eject piston allows the resilient displacement of the eject pin against the electrical contact in the bandoleer.

The indexing mechanism for advancing the bandoleer comprises a pneumatic piston mechanism for reciprocating a piston rod in response to application of pneumatic pressure to the piston mechanism. A pawl mechanism is coupled to the piston mechanism. The pawl mechanism is advanced by disposition of the piston rod. A ratchet wheel is motively engaged to the pawl mechanism. Advancement of the pawl mechanism rotates the ratchet wheel through a predetermined angular rotation. An indexing drum is coupled to the ratchet wheel. The indexing drum rotates with rotation of the ratchet wheel in response to advance of the pawl mechanism. The indexing drum engages one contact carrier of the bandoleer of contact carriers and indexes the contact into position for operative coupling with the ejection mechanism for ejecting the electrical contact from the bandoleer of contact carriers.

In another embodiment the mechanism for advancing the bandoleer comprises an indexing drum for engaging the contacts of the bandoleer, and a mechanism for selectively ratcheting the indexing drum through a predetermined angular rotation to move the engaged electrical contact of the bandoleer into operative position with the ejection mechanism.

The trigger mechanism for actuating the indexing mechanism for advancing the bandoleer, the ejection mechanism for ejecting the electrical contact from the bandoleer, and the crimping mechanism for crimping the electrical contact onto the wire comprises a single trigger. A cam mechanism is coupled to the trigger. A corresponding plurality of pneumatic valves are included. The cam mechanism actuates each of the corresponding pneumatic valves in sequential order. Each valve provides an actuated pneumatic pressure to a corresponding one of the indexing mechanism for advancing the bandoleer, the ejection mechanism for ejecting the electrical contact from one of the contact carriers of the bandoleer, and the crimping mechanism for crimping the electrical contact of the wire.

The invention further comprises a locking mechanism for locking the single trigger. The locking mechanism limits the motion of the trigger so that at least one of the valves cannot thereafter be actuated. As a result an additional one of the contacts may not be advanced, ejected or crimped.

The invention can also be characterized as an automatic pneumatic hand-held power crimping tool for crimping contacts included within contact carriers. The contact carriers are coupled together to form a bandoleer of contact carriers. One electrical contact is disposed within each of the contact carriers of the bandoleer. At least one wire is to be crimped to each electrical contact which is included within the contact carrier. The tool comprises a trigger, a cam mechanism coupled to the trigger, and a plurality of valves. The cam mechanism sequentially activates the valves. The valves couple pressurized air to a corresponding output of each valve. An indexing mechanism advances the bandoleer of electrical contacts within the tool to align one of the contacts and the bandoleer to an ejection position. The indexing mechanism is coupled to one of the valves and is responsive to pressurized air provided through the corresponding valve. An ejection mechanism ejects the electrical contact from the contact carrier which is positioned in the ejection position. The electrical contact is disposed into a crimping position within the tool. The ejection mechanism is coupled to one of the plurality of valves and is responsive to pressurized air provided therethrough. A crimping mechanism crimps the electrical contact when in the crimping position. The wire is placed into the electrical contact before activation of the crimping mechanism. The crimping mechanism is coupled to one of the plurality of valves and is responsive to pressurized air provided thereto.

As a result, activation of the trigger automatically advances one of the contact carriers, ejects an electrical contact from the advanced contact carrier, and crimps the contact to the wire.

The invention is also an improved method in a hand tool for crimping an electrical contact within a contact carrier to a wire comprises the steps of advancing a bandoleer of contact carriers. Each contact carrier contains a electrical contact. The bandoleer is advanced until one of the contact carriers and electrical contact is in an ejectable position. The electrical contact is automatically ejected from the contact carrier when the contact carrier is disposed in the ejection position. The electrical contact is ejected from the contact carrier into a crimping position. The wire to be crimped is placed into the electrical contact. The electrical contact is subsequently crimped onto the wire in a manner regulated to accommodate the gauge of the wire and of the electrical contact.

The invention is illustrated in the following drawings wherein like elements are referenced by like numerals.

Figures 9, 9A:
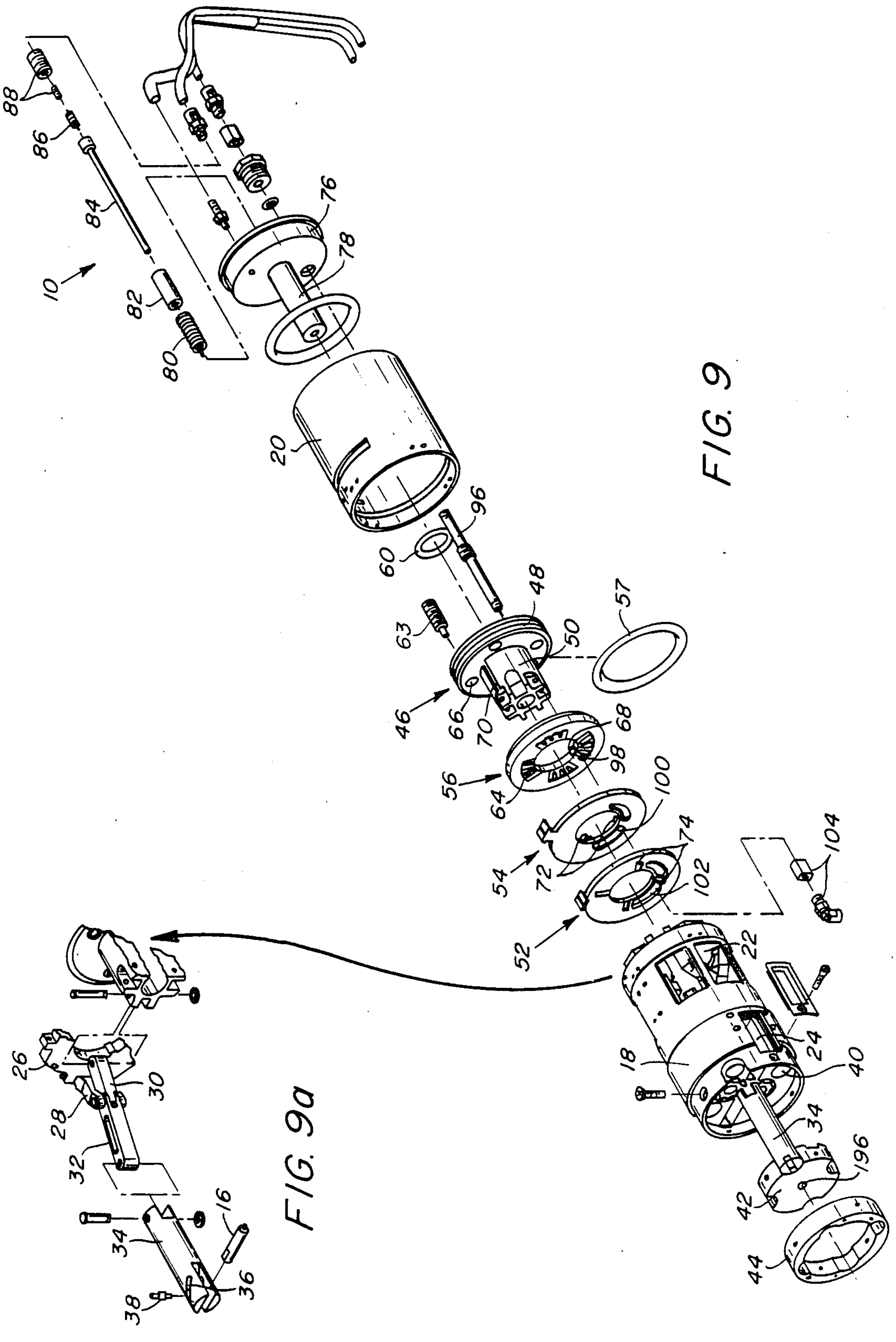
FIG. 9 is an exploded perspective view of a portion of the tool as seen in FIG. 1, particularly illustrating those elements used to effectuate the crimping action.

FIG. **9*a* is an exploded perspective view of a portion of the mechanism of FIG. 9 which is partially obscured in the view of FIG. 9**.

FIG. **9*b* is an exploded perspective view of another portion of the mechanism of FIG. 9 which is obscured in the view of FIG. 9**.

Figure 10:
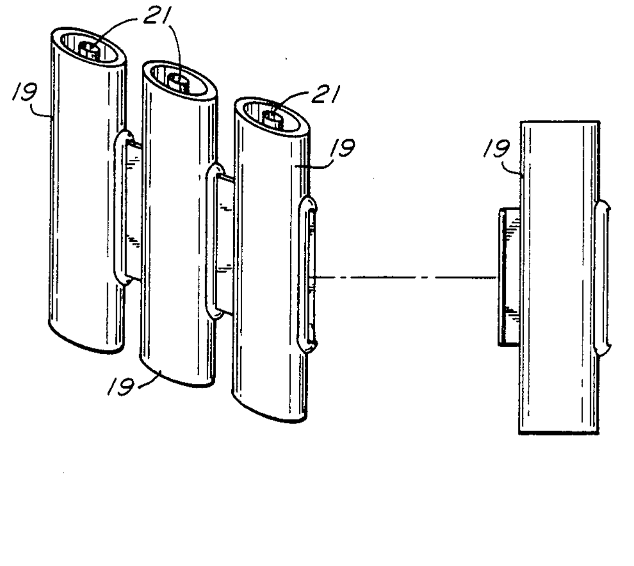

FIG. 10 is a perspective view of a bandoleer of contact carriers utilized in the tool depicted in FIGS. **1–9*b***.

The invention and its mode of operation may be better understood by now turning to the following detailed description.

DETAILED DESCRIPTION OF THE PREFERRED EMBODIMENT

An automatic pneumatically powered crimping hand tool for making electrical connections is devised by advancing a bandoleer of contact carriers, each contact carrier includes a contact, and by aligning one of the carriers and contacts in an ejection position within the tool. The bandoleer is advanced by engagement with a sprocketed indexing drum which is rotated by a pneumatically powered pawl and ratchet combination. Once in the ejection position, a pneumatically powered ejection pin is then longitudinally advanced into the contact carrier to eject the contact from the contact carrier into a crimping position. Once the contact is placed within the tool in a crimping position, the wire is then manually placed within the contact. A trigger, which has been approximately 50% depressed to automatically and serially activate the advancement and ejection of the contact carrier and contact within the tool is then manually depressed through the remaining portion of its throw to activate a pneumatic piston coupled through linkages to drive four indentor pins into the electrical contact. The contact is mechanically deformed about the wire making both a secure electrical and mechanical contact with the wire. A locking mechanism holds the trigger in a position which prevents subsequent activation of the indexing drum for advancing the bandoleer of contact carriers or of the ejection pin for ejecting contacts from contact carriers. A lock release button must be depressed to allow the trigger to resume its original position. The operation may then be repeated on the next serially connected contact carriers within the bandoleer of contacts. Adjustment may be made within the hand tool with respect to the extent of crimping motion to regulate the degree of indentation both with respect to the gauge of the contact and the gauge of the wire to be crimped.

Before considering each detailed aspect of the crimping tool as illustrated, consider first its basic overall operation. To assure that every crimp has a uniform high quality, the crimping tool, as will be described below, includes an internal latching feature to insure that each phase of the crimping cycle has been completed prior to execution of the next cycle. For example, actuation of the finger trigger serves a dual role. At a 50% closure of the trigger, a bandoleer of contact carriers will be indexed, and a new contact is put in the position of the crimp head into the crimp die area. The operator then inserts the wire to be crimped into the contact. Final closure of the trigger drives the indentor down onto the contact and the wire to make the required crimp. All operations will remain locked at this point until the tool is manually reset by the use of a thumb switch. Until the thumb switch is reset, the removal of the wire and contact assembly connot be completed.

Figure 1:
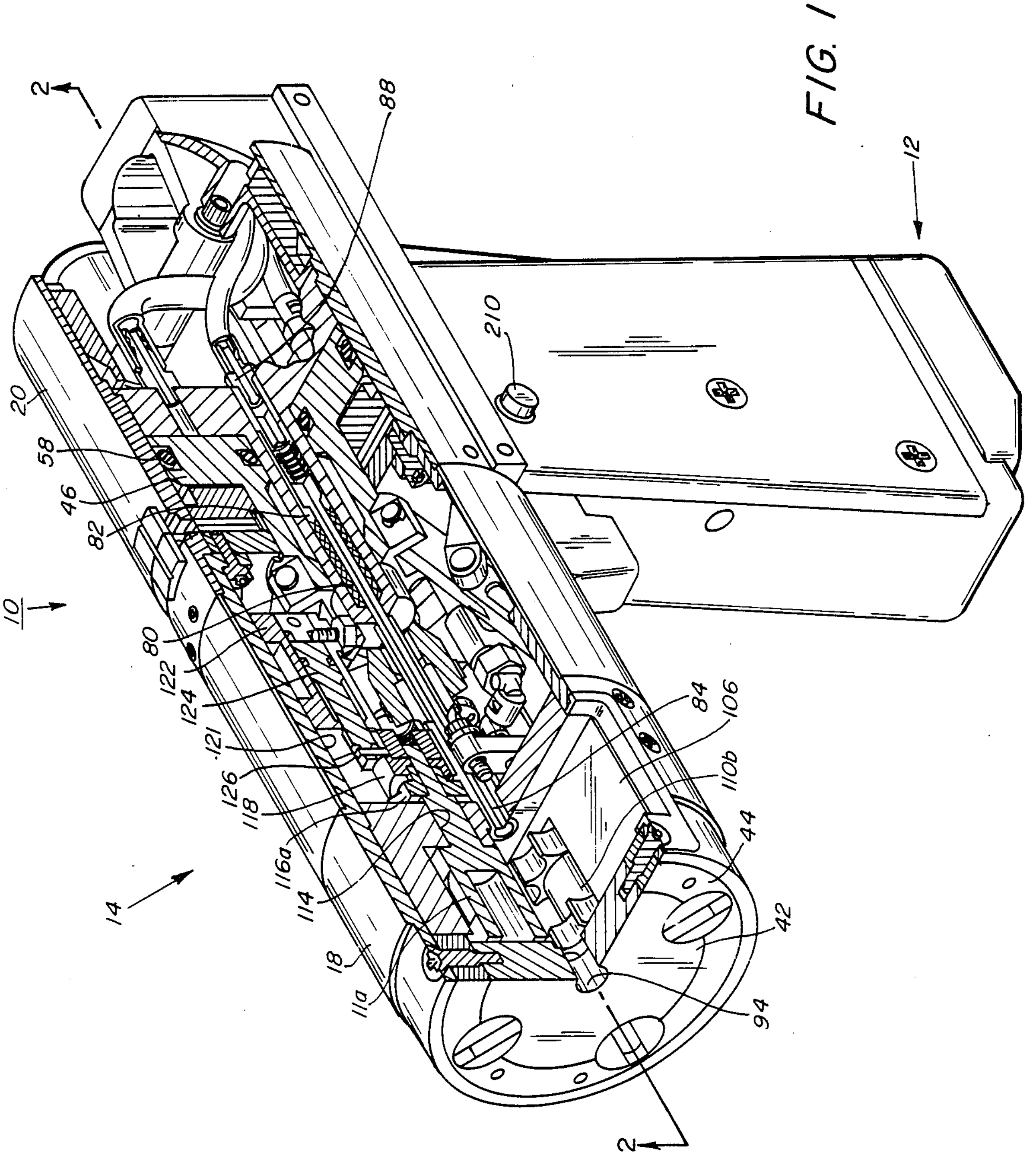
FIG. 1 is a cutaway perspective view of a first embodiment of the invention showing an assembled power crimping tool. The remaining views of this embodiment are illustrated in FIGS. 9, **9*a* and 10**.

Before considering any further aspect of the operation of the crimping tool as a whole, turn now to FIGS. 1–10 which depict two illustrated embodiments. A first embodiment is described and shown in connection with FIGS. 1, 9, 9*a* and 10, and a second embodiment is described and shown in connection with FIGS. 2–8. FIG. 1 is a perspective view of tool 10 and except for certain internal detail described below, is substantially the same in the two embodiments. A power crimping tool, generally denoted by the reference character 10, is outwardly comprised of two major sections, a handle, generally denoted by reference numeral 12, and a cylindrical body, generally denoted by reference numeral 14, which houses four indentors 16 used to form a crimp in contact 21 in contact carrier 19 as shown in FIG. 10. Tool 10 is pneumatic and handle 12 is connected to body 14 at a position close to the center of gravity of body 14 to allow for easy handling of tool 10. Handle 12 includes a trigger mechanism, described below, which provides the two-step cycle described above.

Figure 2:
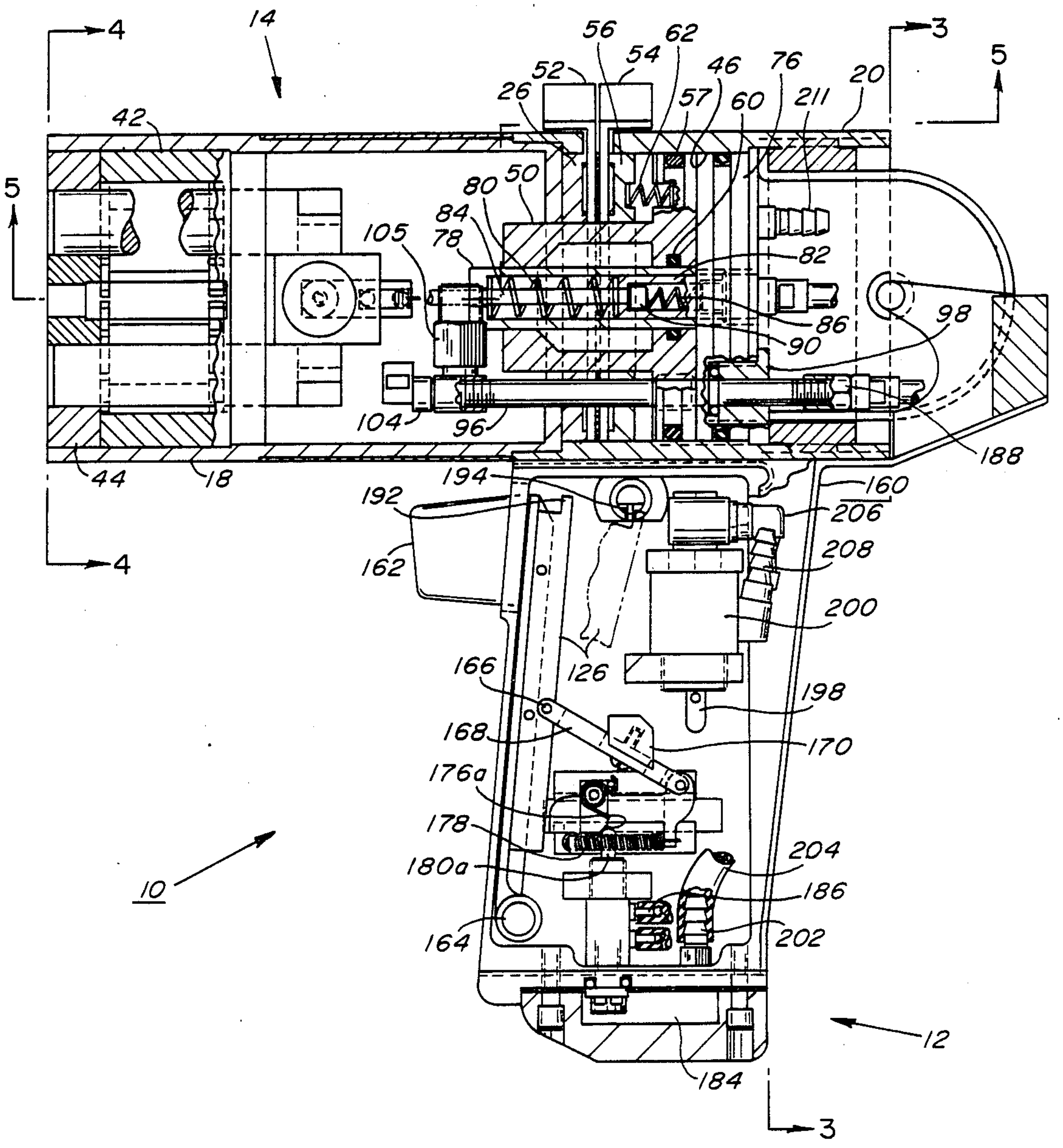
FIG. 2 is a cross-sectional side view of a second embodiment of the assembled power crimping tool as would be seen through section lines 2—2 of FIG. 1. The remaining views of the second embodiment are shown in FIGS. 3–8.

First consider the indentor mechanism within body 14. Body 14 is comprised of a front housing assembly primarily contained within a front housing 18 and a back housing assembly primarily contained within a back housing 20 as best seen in FIG. 2 but also clearly illustrated within the cutaway perspective view of FIG. 1.

Figure 6:
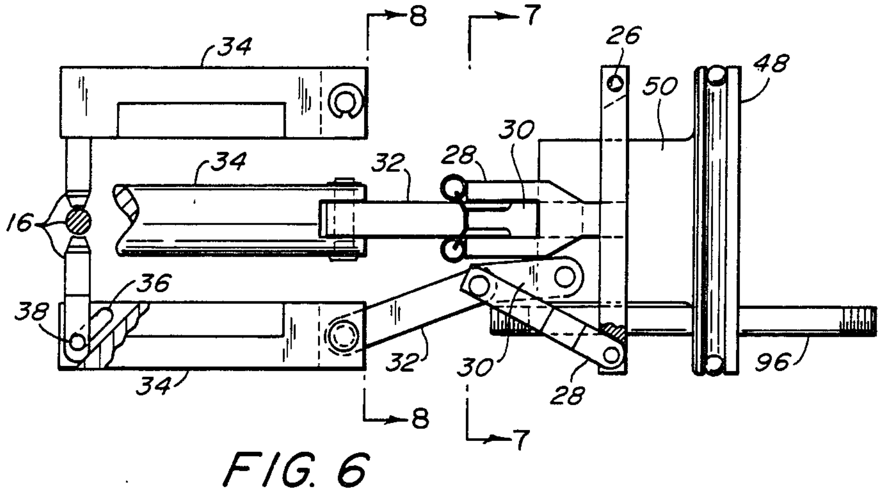
FIG. 6 is a simplified top plan view of selected parts of the crimping mechanism included within the tool of FIGS. 1–5.
Figure 7:
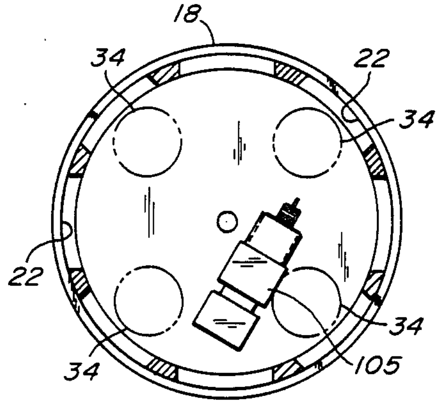
FIG. 7 is a simplified elevational view of selected ones of the crimping elements as would be seen in the position of section 7—7 of FIG. 6.

Consider first the front housing assembly. As seen in FIGS. 9 and 10, front housing 18 is a general cylindrical shell having a plurality of cutouts 22 defined therethrough including a side cutout 24 through which a bandoleer of contact carriers 19 will be disposed into a crimping die. A selector cam-B 26, as best shown in perspective broken view in FIG. 9*a*, is screwed to the back of front housing 18. Four subassemblies are connected to selector cam-B 26. One of the four subassemblies is shown in perspective exploded view in FIG. 9*a*. A first forked lever 28 is pivotally connected to selector cam-B 26 at one end and at its opposing end to two linkage arms 30 and 32, namely a back link 30 and front link 32 which are pivoted not only with respect to each other but to arm 28 as well. A diagonal slot 36 is defined in the forward end of indentor shaft 34 in which rides a displaceable indentor pin 38. Indentor pin 38 in turn is coupled to indentor 16. Forward and rearward movement of indentor shaft 34 results in the radial compression and retraction of indentors 16 against contact carrier 19. The mechanism for the translation of the longitudinal movement of indentor shaft 34 to the radial movement of indentor 16 is best seen in the cutaway view of FIG. 6 (which actually pertains to the second embodiment, but that portion discussed here and shown in FIG. 6 is common to both embodiments), which shows indentor pin 38 in its radially outermost position and indentor shaft 34 in its longitudinally rearmost position. Forward motion of indentor shaft 34 drives pin 38 to the bottom or radially inward end of slot 36 thereby forcing indentors 16 radially inward by a corresponding amount.

Actuator shafts 34 are retained within corresponding bores 40 defined in an actuator housing 42 disposed in the forward end of front housing 18 and through corresponding bores in a retainer ring 44 which serves as an end-facing cap on front housing 18. Actuator housing 42 and retainer ring 44 are depicted in cross-sectional view in FIG. 2 and are most easily visualized in the exploded perspective view of FIG. 9 shown there in association with one indentor shaft 34. The remaining three indentor shafts are omitted for the sake of clarity.

Selector cam-B 26 has a central bore through which is inserted main piston 46 which is comprised of an annular flange 48 and an axial cylindrical member 50 extending therefrom. However, disposed between main piston 46 and selector cam-B 26 is first a selector lever-B 52, a selector lever-A 54, and a selector cam-A 56 as best shown in exploded perspective view of FIG. 9, and in the order just recited as moving from selector cam-B 25 longitudinally rearward within body 14. As best depicted in FIG. 6, the rearward end of rear links 30 are pivotally coupled to the forward cylindrical portion 50 of main piston 46. Therefore, the longitudinal movement of main piston 46 is translated utlimately into the longitudinal movement of indentor shafts 34 and their corresponding indentors 16.

Main piston 46 is disposed in a pneumatically sealed and reciprocating relationship within back housing 20. The pneumatic seal is perfected on the outer radius of main piston 46 by means of O-ring 58 and within the inner radius of main piston 46 by O-ring 60 as best depicted in cross-sectional view in FIG. 2. O-ring 60 is shown in exploded perspective view in FIG. 9. The front end of back housing 20 is sealed by selector cam-A 56 which is held apart from main piston 46 by means of a plurality of compression springs 62, one of which is shown in FIG. 2. As will be described below, main piston 46 is driven longitudinally forward toward fixed selector cam-A 56 and is resiliently urged longitudinally rearward therefrom by springs 62.

In the embodiment of FIGS. 1, 9, 9a and 9b, the longitudinal throw of main piston 46 is limited by the coaction of plunger screw 63. As best illustrated in FIG. 9, four plunger screws are threaded through main piston 46 through threaded bores 66. Only one of such plunger screws 62 is illustrated in FIG. 9 for the sake of clarity. Plunger screws 62 are thus longitudinally fixed to main piston 46.

Selector cam-A 56 is splined by means of two radially extending square tabs 68, one of which is shown in FIG. 9 to corresponding longitudinal grooves 70 defined within the cylindrical longitudinal extension 50 of main piston 46. Selector cam-A 56 is thus free to be longitudinally displaced with respect to the cylindrical face 48 of main piston 46. Plunger screws 62 will thus extend through piston 46 and contact opposing facing surface of selector cam-A 56. However, the longitudinal position of selector cam-A 56 with respect to main piston 46 will be determined by the relative position of selector lever-A 54. Selector lever-A 54 includes four longitudinally extending tabs 72, two of which are shown in FIG. 9. Each of the four tabs 72 can be selectively disposed into a corresponding one of the indented steps 64 defined in the opposing face of selector cam-A 56. Thus, the relative longitudinal position of selector lever-A 54 and selector cam-A 56 can be changed by rotating selector lever-A 54 and hence changing the longitudinal throw of piston 46 which in turn will ultimately limit the amount of movement of indentor 16 to accommodate different gauge contacts.

Similarly, longitudinally in front of selector lever-A 54 is selector lever-B 52 as illustrated in FIG. 2 and as better illustrated in FIG. 9. Selector lever-B 52 has four radially extending tabs 74, all of which are visible in FIG. 9. Tabs 74 extend toward selector cam-B 26. Selector cam-B 26 has a plurality of indented steps defined in its opposing surface similar to steps 64 defined in selector cam-A 56 (not shown in FIG. 9). Thus, in the same manner as in the combination of selector lever-A 54 and selector cam-A 56, selector lever-B 52 and cam-B 26 may be relatively longitudinally displaced from each other by rotation of selector lever-B 52. The longitudinal displacements are additive thereby giving a wide range of indentor displacements according to the relative rotation of selector lever arms A 52 and B 54. Selector lever-B is adjusted to the desired wire size while selector lever-A is adjusted to the size of contact to be crimped.

Main piston 64 reciprocates within back housing 20 about a fixed piston housing 76 as best illustrated in FIG. 9, and also shown in cross section in FIG. 2. Piston housing 76 has an axial longitudinal hollow cylindrical member 78 extending therefrom in which is placed a mechanism for ejecting the contact from the contact carrier.

Turning first to FIG. 9, the ejector mechanism as shown in exploded disassembled view, and comprises a compression spring 80 which will bear against an eject piston 82. Telescopically disposed and reciprocating within eject piston 82 is an eject pin 84. Eject pin 84 has its rearward end disposed against a compression spring 86 whose other end in turn is mated against a screw and bushing combination 88. The combination and operation of the various parts of the eject mechanism as shown in FIG. 9 is better understood by turning to the assembled view of FIG. 2 where the common elements are visualized. There, spring 86 is clearly shown as disposed within eject piston 82 together with an enlarged pedestal end 90 of eject pin 84. Eject pin 84 is then disposed within and along the axis of compression spring 80 one end of which bears against eject piston 82 and the other end of which bears against the interior end of cylindrical member 78 of piston housing 76. When compressed air is admitted through bushing 88, eject piston 82 will be longitudinally disposed to the left as shown in FIG. 2 against the pressure of spring 80. Spring 86 will then force the eject pin 84 to follow piston 82 as it is longitudinally displaced to the left. The lefthand portion of eject pin 84 has been omitted in FIG. 2 for the sake of clarity. However, the full length of eject pin 84 can be seen in FIG. 1 as extending toward the front of the tool and terminating within actuator housing 42 through which the electrical contacts are placed. Thus, eject pin 84 acts as a ramrod to push the electrical contacts out of the front of the tool through ejection hole 94 defined within actuator housing 42.

Compressed air is also provided to a ratchet mechanism which is used to index a bandoleer of contact carriers into the crimping position, as will now be described. The indexing mechanism is different in the two embodiments which are describe here. Return now to the exploded view of the first embodiment of FIG. 9. Slidingly disposed through main piston 46 is a transfer tube 96. As best seen in FIG. 2, transfer tube 96 is sealed into piston housing 76 by means of a bushing and O-ring combination 98. Transfer tube 96 is disposed through main piston 46 in a sliding but sealed configuration since transfer tube 96 is longitudinally fixed within tool 10 and does not interfere with the penumatic operation of main piston 46. Transfer tube 96 is thus disposed through a bore 98 defined through selector cam-A 56 and then through radial slots 100, 102 defined in selector lever-A 54 and selector lever-B 52. Radial slots 102 permit the rotation of selector levers A 54 and B 52 while permitting the disposition therethrough of transfer tube 96 as illustrated in FIG. 2. Transfer tube 96 terminates in a fitting 104 shown in perspective view in FIG. 9 and in side view in FIG. 2. Up to this point the indexing mechanism in the two embodiments are identical.

Figure 8:
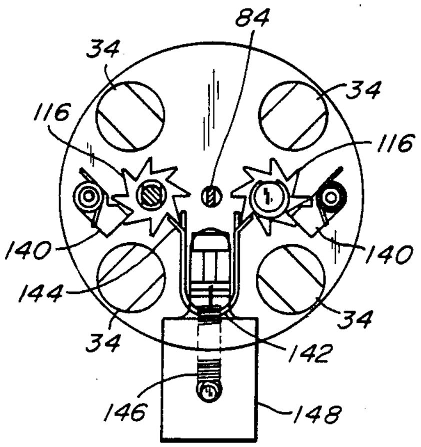
FIG. 8 is a simplified elevational view of selected ones of the elements in a second embodiment used in the crimping cycle as will be seen in the position of section lines 8—8 of FIG. 6.
Figure 9B:
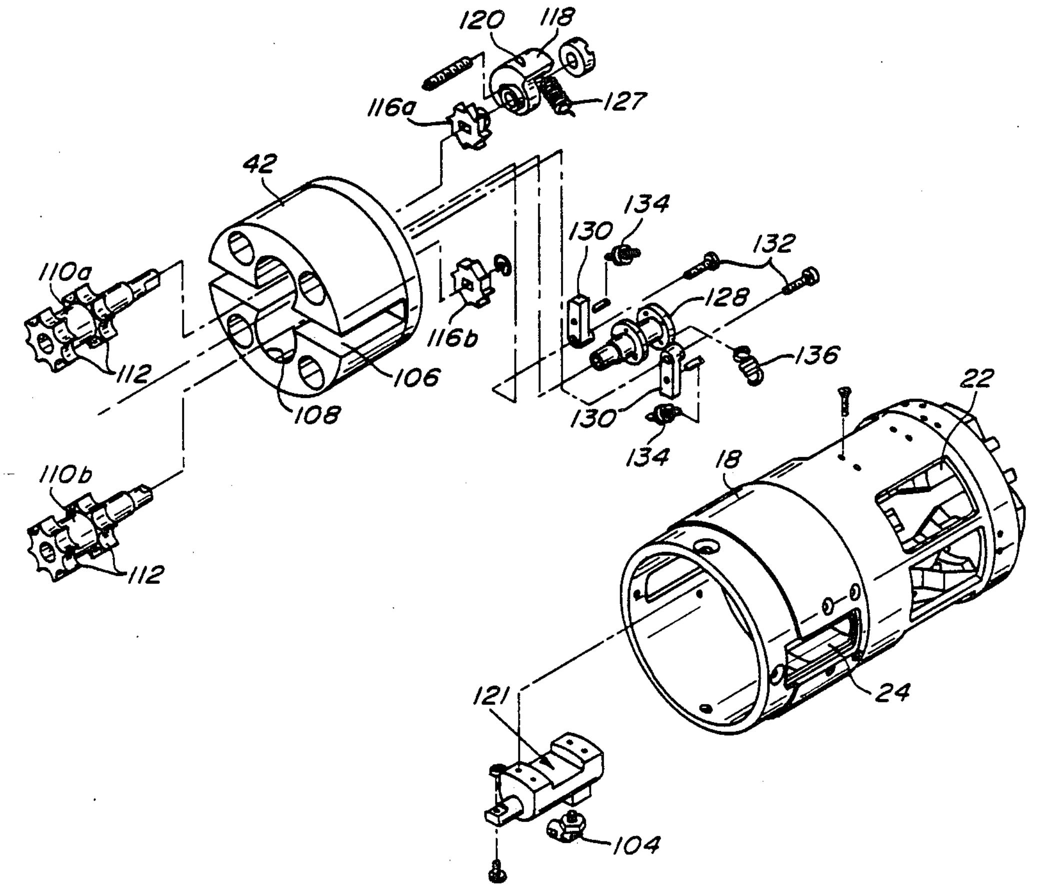

In the first embodiment, air fitting 104 is then connected through tubing (not shown) to an indexing mechanism which is shown in a first embodiment in FIG. 1, 9, and 9b, and is depicted in the second embodiment in FIGS. 2, 5, 7 and 8.

Consider the indexing mechanism of the first embodiment as shown in FIGS. 1, and 9b. The bandoleer of contact carriers as shown in FIG. 10 is fed into a bandoleer slot 106 as shown in the cutaway view in FIG. 1 and as better shown in perspective view within actuator housing 42 as shown in exploded perspective view in FIG. 9b. Bandoleer slot 106 extends radially through the entire diameter of actuator housing 42. Disposed within a bilobe cavity 108, defined within actuator housing 42, are two identical indexing drums 110. Each indexing drum 110 has two sprocketed wheels 112 which radially extend to engage contact carrier 19 of FIG. 10. FIG. 1 shows one of the indexer drums in perspective in the lower portion of bandoleer slot 106 and the opposing indexer drum 110 is shown in cross section.

Each indexer drum 110 is journaled to actuator housing 92 through bore 114 and is keyed to a ratched wheel 116 which is illustrated in cross section in FIG. 1 and is shown in exploded perspective view in FIG. 10. One indexer drum 110 is driven, such as the drum shown in cross-sectional view in FIG. 1. Drum **110*a* is shown in cross section in FIG. 1 while the opposing indexer drum 110*b* is connected to its corresponding ratchet wheel 116*b*** to form part of the indexer lock mechanism as described below.

However, consider first the driving mechanism for driven drum **110*a*. Ratchet wheel 116*a* is rotationally fixed to a pawl 118, best shown in perspective view in FIG. 9*b* but also shown in cross-sectional view in FIG. 1. Pawl 118 has a diagonal slot 120 defined therein similar in principle to diagonal slots 36 formed in the ends of indentor shafts 34 described above. Fixed to the inside of front housing 18 is an indexer piston, generally denoted by reference numeral 120. Indexer piston 120 includes a housing 122 and an internal reciprocating piston rod 124 which is pneumatically operated by compressed air which is selectively supplied from fitting 104 and transfer tube 96 discussed above. The indexer piston rod 124 has a drive pin 126 disposed therethrough and into diagonal slot 120 defined in pawl 118. Therefore, reciprocation of piston rod 124 will cause ratchet lever 116*a* to advance. An extension spring 127 is connected to pawl 118 to return it and piston rod 124 to their original position. Pawl 118 is coupled to ratchet 116*a* by a conventional ratcheting coupling between the elements so that the driving force is applied to ratchet wheel 116*a*** only when driven in a preferred direction.

Moreover, ratchet wheels **116*a* and 116*b* are each locked in place by an indexer locking mechanism which is best shown in FIG. 9*b*. The locking mechanism includes an axially aligned collector ring 128 through which ejector pin 84 is axially disposed and reciprocates. On each side of collector ring 128 is an indexer lock pawl 130 pivotally coupled at one end to actuator housing 92 by means of screws 132. Each indexer lock pawl 130 is coupled to collector ring 128 by means of an extension spring 134. Thus, one pawl is brought into engagement with the teeth of ratchet wheel 116*a* while the opposing pawl is brought into contact with the teeth of ratchet wheel 116*b*. The ratchet wheel and pawl contact, not shown in the embodiment of FIGS. 1 and 9*b*, is similar to that shown for the second embodiment which is depicted in FIG. 8. Collector ring 128 is rotatable about ejector pin 84 and within actuator housing 42 but is urged in a preferred angular orientation by means of extension spring 136. Collector ring 128 is rotated by actuation of pawl 118 through a connection between pawl 118 and collector ring 128 by means of spring 126. Pawl 118 is then returned to its original configuration when air pressure is moved from piston 124 by virtue of the extension force of springs 126 and 136**.

Turn now to the second embodiment of the indexing mechanism as depicted in FIGS. 4, 5, 6 and 8. The second embodiment of the indexing mechanism is substantially identical to the first with the exception of the means by which ratchet wheels 116 are driven. In the second embodiment, ratchet wheels 116, as best shown in plan view in FIG. 8, are treated in an identical manner. As before, each ratchet wheel 116 is operatively connected to a spring biased index lock pawl 140. Ratchet wheels 116 are indexed by means of a resilient U-shaped pawl 142. Pawl 142 includes an inclined tab 144 which engages one of the sprockets of ratchet wheel 116 to turn ratchet wheel 116 as pawl 142 is moved vertically upward as shown in FIG. 8. However, when under the return force of extension spring 146, pawl 142 is returned to its original position, as depicted in FIG. 8. The resilient horseshoe shape of pawl 142 gives sufficiently to allow tabs 144 to ride over the sprocket tooth of ratchet wheels 116, which are immobilized by index lock pawls 140.

Figure 5:
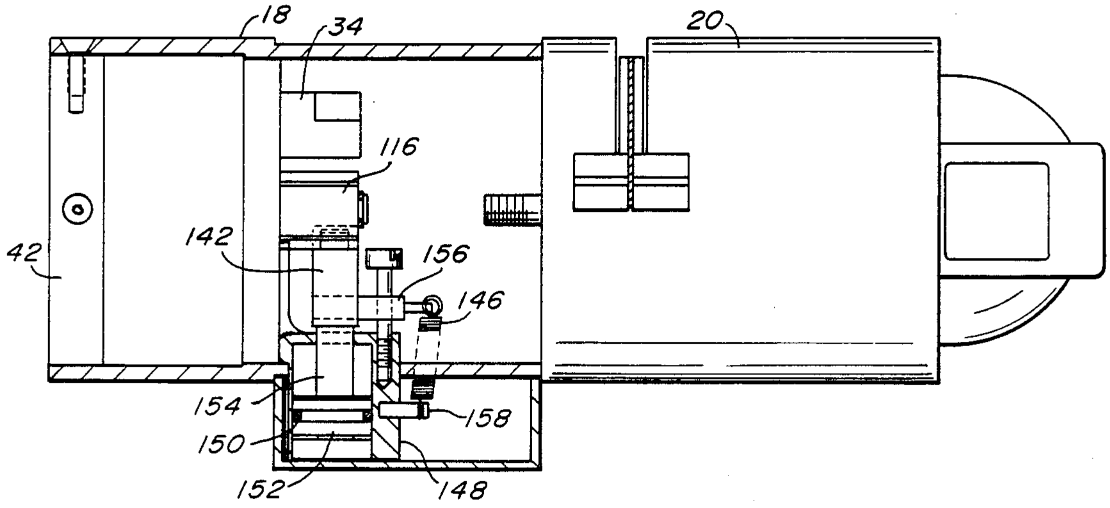
FIG. 5 is a top simplified cross-sectional view of the assembled power tool as would be seen through section lines 5—5 of FIG. 2.

Pawl 142 is actuated in its driving stroke by a piston, generally denoted by reference numeral 148. Piston 148 is pneumatically powered by air pressure supplied through air fitting 104 and transfer tube 96. Piston 148 is vented by whisker valve 105 shown in FIGS. 2 and 7 which is actuated by movement of the linkeage connected to indentor shafts 34 by a metallic whisker. Piston 148 is comprised of a piston cylinder 150 in which a piston and piston rod 152 telescopically reciprocate. Piston rod 154 is coupled by means of a bolt 156 to extension spring 146 which is coupled at its opposing end to a post 158 fixed to piston housing 150 as best seen in FIG. 5.

Figure 3:
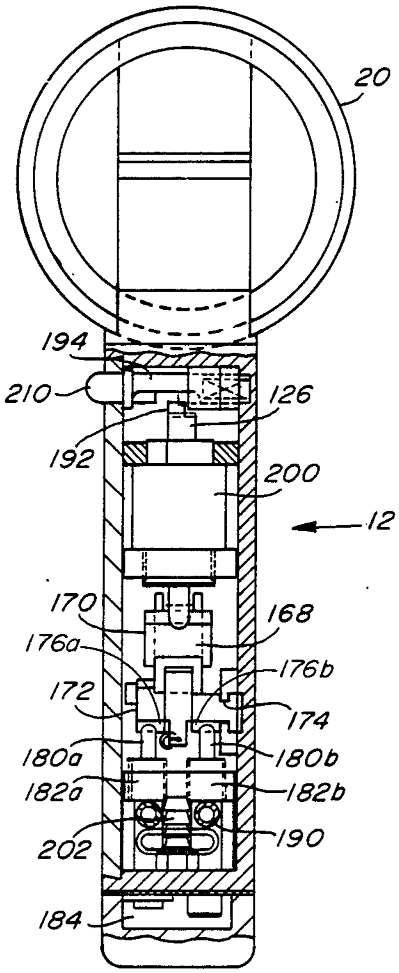
FIG. 3 is a cross sectional rear view of the assembled crimping tool of FIG. 2 as seen through lines 3—3 of FIG. 2.
Figure 4:
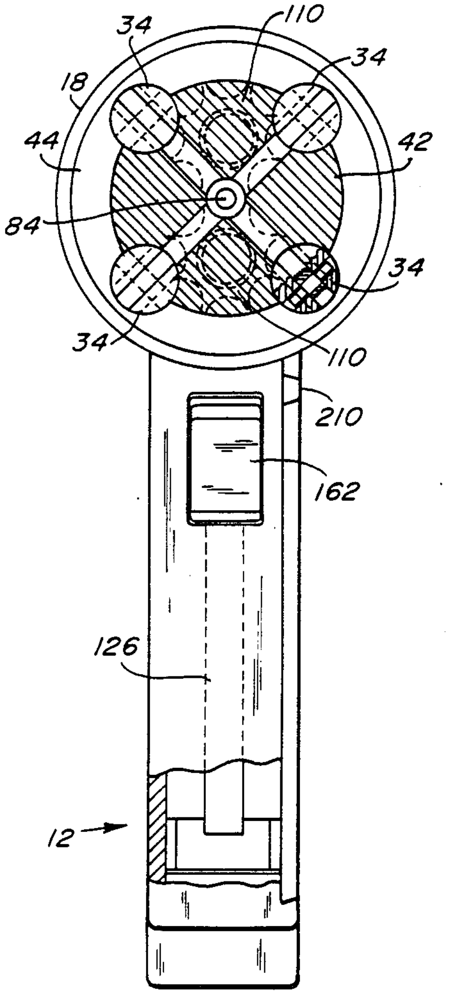
FIG. 4 is a front cross-sectional view of the assembled power tool as seen through lines 4—4 of FIG. 2.

Consider now the trigger mechanism as best illustrated in a cross-sectional plan view in FIGS. 2 and 3. Handle mechanism 12 is comprised of a grip casing 160 which is affixed to body 14 of tool 10 at a suitable point as determined by balance. Extending through casing 160 is a trigger 162 which is pivoted to the casing at its lower end 164. Pivoted to the midpoint 166 of trigger 162 is a linkage 168 which carries an actuator block 170 which is affixed thereto. Opposing end of linkage 168 is pivotally coupled to a Y-cam 172. Y-cam 172 is retained and is slidable within a T-slot 174 affixed to the side of housing 160. The bottom of Y-cam 172 includes two cam portions **176*a* and 176*b*, both of which are shown in the end sectional view of FIG. 3 and one of which is shown in cross-sectional view of FIG. 2. Y-cam 172 is urged to its initial position by means of an extension spring 178, which position it assumes when trigger 162 is not activated. Cams 176*a* and 176*b* contact valve rods 180*a* and 180*b*, respectively, of pneumatic valves 182*a* and 182*b* respectively. Valve 180*a* would be first actuated by the movement of Y-cam 172 in response to depression of trigger 162. When trigger 162 has been depressed approximately halfway through its maximum throw, valve 182*a* is actuated, thereby delivering air pressure supplied to handle cavity 184 through a fixture (not shown) through tubing 186 (only part of which is shown) to an air fitting 188 coupled to transfer tube 96. As described above, air pressure provided through transfer tube 196 will cause activation of the indexing mechanism, ultimately resulting in rotation of indexer drums 110*a* and 110*b*** as may be appropriate to the embodiment.

For example, in the embodiment of FIGS. 1 and **9*b* indexer piston 124 will be advanced causing pawl 118 to advance ratchet 116*a* which is keyed to indexer drum 110*a* through one position or 45 degrees. Since a bandoleer of contact carriers 19 as shown in FIG. 10 has already been placed into bandoleer slot 106 until it is against indexer drums 110*a* and 110*b*, advancement of indexer drum 110*a* will cause the bandoleer to be pulled through the chamber causing idler indexer drum 110*b* to be advanced by one position of 45 degrees. Reverse rotation of indexer drums 110*a* and 110*b* is prevented by indexer pawl locks 130 shown in FIG. 9*b***.

Further depression of trigger 162 causes Y-pivot 172 to advance to its next position which activates eject valve 180*b*. Activation of eject valve 180*b* allows air to proceed from cavity 184 in handle 12 through flexible hose 190 (only part of which is shown in FIG. 3) which in turn is coupled to the eject fitting 88 within body 14 as depicted in FIG. 2. This in turn causes the longitudinal advance of eject piston 82 which then will push the contact being carried within contact carriers 19 into the crimp head by means of eject pin 84. Since at this point trigger 162 will have been depressed approximately 50% of its travel, the upper end 192 of trigger 162 will be latched behind a latching mechanism, generally denoted by reference numeral 194, as best depicted in FIG. 3 but also shown in side view in FIG. 2 with the relevant portion of the trigger mechanism shown in broken away dotted line.

At this point the bandoleer has been indexed and a contact has been placed within the crimp chamber 196 defined within indentor guide 42. The wire to be crimped is then manually inserted into the contact within crimp chamber 196 before any further depression of trigger 162. illustrated in FIG. 2. Hose 204 is coupled to the intake air fitting 206 of valve 200 while its output fitting 208 is coupled through hosing (not shown) to main valve fitting 21 within body 14 which supplies air through piston housing 76 to the space behind main piston 46. As described, advance of piston 46 forces indentors 16 into the contact containing the wire thus forming the required crimp.

Having made a crimp, no additional crimping action can be performed since latch 194 prevents the activation of either valve 180*a* or valve 180*b* which would cause the advancement of bandoleer 19 and the ejection of a contact into the crimp chamber. Therefore, tool 10 must be reset by depressing spring loaded button 210 which will cause end 192 of trigger 162 to clear tab 212, allowing trigger 162 to resume its original position along with Y-pivot 172.

Many modifications or alterations may be made by those having ordinary skill in the art without departing from the spirit and scope of the present invention. For example, the illustrated embodiment has been described as a pneumatic tool. It is expressly contemplated that the tool could be designed to be hydraulically powered as well in which case it could be made smaller and more powerful. The illustrated embodiments, which are set forth only for the purpose of example, must thus not be taken as limiting the scope of the invention which is defined in the following claims.

I claim:

1. A hand-held externally powered apparatus for forming a crimped electrical contact onto a wire, said electrical contact included within a bandoleer of electrical contact carriers, comprising:

a hand-held housing;

indexing means for advancing said bandoleer of contact carriers, said indexing means disposed in said hand-held housing;

ejection means for ejecting said electrical contact from said bandoleer to place said electrical contact in a crimping position, said ejection means disposed in said hand-held housing; and crimping means for crimping said electrical contact when said electrical contact has been ejected from said bandoleer into said crimping position, said crimping means disposed in said hand-held housing, manually operated trigger means for serially activating and providing external power to said first indexing means for advancing said bandoleer, then activating and selectively providing external power to said ejection means for ejecting said electrical contact from said bandoleer, and finally activating and selectively providing external power to said crimping means for crimping said electrical contact, said indexing ejection and crimping means each being externally powered, whereby said electrical contact is crimped onto said wire by automatic serial activation of each of said hand-held means.

2. The apparatus of claim 1 wherein said crimping means for crimping said electrical contact comprises:

a plurality of indent pins;

a corresponding plurality of linkage means coupled to said indent pins; and a main pneumatic piston coupled to said linkage means for imparting a force through said linkage means to said indentor pins, said indentor pins contacting said electrical contact to crimp said electrical contact about said wire disposed therein.

3. The apparatus of claim 2 further comprising selector means for regulating the amount of movement of said main piston whereby different gauge wires and contacts are accommodated, said selector means disposed in said hand-held housing.

4. The apparatus of claim 3 when said selector means for regulating movement of said main piston further comprises:

first means for adjusting movement of said main piston and hence said indentor pins to accommodate different gauges of contacts; and second means for regulating movement of said main piston and hence said indentor pins to accommodate different gauges of wire to be crimped within said contacts.

5. The apparatus of claim 1 wherein said electrical contact to be crimped is axially disposed within said apparatus and said ejection means for ejecting said electrical contact from said bandoleer comprises:

an eject piston axially disposed within said apparatus; and an eject pin axially disposed within said apparatus, said eject pin extending through said apparatus to contact said electrical contact within said bandoleer, longitudinal disposition of said eject pin forcing said electrical contact from said bandoleer, said eject pin being coupled to said eject piston wherein pneumatic displacement of said eject piston allows the resilient displacement of said eject pin against said electrical contact in said bandoleer.

6. The apparatus of claim 2 wherein said electrical contact to be crimped is axially disposed within said apparatus and said means for ejecting said electrical contact from said bandoleer comprises:

an eject piston axially disposed within said apparatus; and an eject pin axially disposed within said apparatus, said eject pin extending through said apparatus to contact said electrical contact within said bandoleer, longitudinal disposition of said eject pin forcing said electrical contact from said bandoleer, said eject pin being coupled to said eject piston wherein pneumatic displacement of said eject piston allows the resilient displacement of said eject pin against said electrical contact in said bandoleer.

7. The apparatus of claim 4 wherein said electrical contact to be crimped is axially disposed within said apparatus and said means for ejecting said electrical contact from said bandoleer comprises:

an eject piston axially disposed within said apparatus; and an eject pin axially disposed within said apparatus, said eject pin extending through said apparatus to contact said electrical contact within said bandoleer, longitudinal disposition of said eject pin forcing said electrical contact from said bandoleer, said eject pin being coupled to said eject piston wherein pneumatic displacement of said eject piston allows the resilient displacement of said eject pin against said electrical contact in said bandoleer.

8. The apparatus of claim 1 wherein said indexing means for advancing said bandoleer comprises:

a pneumatic piston means for reciprocating a piston rod in response to application of pneumatic pressure to said piston means;

a pawl mechanism coupled to said piston means, said pawl mechanism being advanced by disposition of said piston rod;

a ratchet wheel motively engaged to said pawl mechanism, advancement of said pawl mechanism rotating said ratchet wheel through a predetermined angular rotation; and an indexing drum coupled to said ratchet wheel, said indexing drum rotating with rotation of said ratchet wheel in response to advance of said pawl mechanism, said indexing drum engaging one contact carrier of said bandoleer of contact carriers and indexing said contact carrier into position for operative coupling with said ejection means for ejecting said electrical contact from said contact carrier.

9. The apparatus of claim 1 wherein said means for advancing said bandoleer comprises:

an indexing drum for engaging said contact carriers of said bandoleer; and means for selectively ratcheting said indexing drum through a predetermined angular rotation to move said engaged electrical contact carrier of said bandoleer into operative position with said ejection means.

10. The apparatus of claim 2 wherein said indexing means for advancing said bandoleer comprises:

an indexing drum for engaging said contact carriers of said bandoleer; and means for selectively ratcheting said indexing drum through a predetermined angular rotation to move said engaged electrical contact carriers of said bandoleer into operative position with said ejection means.

11. The apparatus of claim 5 wherein said indexing means for advancing said bandoleer comprises:

an indexing drum for engaging said contact carriers of said bandoleer; and means for selectively ratcheting said indexing drum through a predetermined angular rotation to move said engaged electrical contact carriers of said bandoleer into operative position with said ejection means.

12. The apparatus of claim 7 wherein said means for advancing said bandoleer comprises:

an indexing drum for engaging said contact carriers of said bandoleer; and means for selectively ratcheting said indexing drum through a predetermined angular rotation to move said engaged electrical contact carrier of said bandoleer into operative position with said ejection means.

13. The apparatus of claim 1 wherein said trigger means for actuating said indexing means for advancing said bandoleer, said ejection means for ejecting said electrical contact from said contact carrier and said crimping means for crimping said electrical contact onto said wire comprises:

a single trigger;

cam means coupled to said trigger; and a corresponding plurality of pneumatic valves, said cam means actuating each of said corresponding pneumatic valves in sequential order, each valve providing an actuated pneumatic pressure to a corresponding one of said indexing means for advancing said bandoleer, said ejection means for ejecting said electrical contact from one of said contact carriers of said bandoleer, and said crimping means for crimping said electrical contact of said wire.

14. The apparatus of claim 13 further comprising locking means for locking said single trigger, said locking means limiting motion of said trigger so that at least one of said valves cannot thereafter be actuated, whereby in turn an additional one of said contact carriers may not be advanced, and said corresponding contact ejected or crimped.

15. An automatic pneumatic hand-held power crimping tool for crimping contacts included within contact carriers, said contact carriers coupled together to form a bandoleer of contact carriers, one electrical contact being disposed within each said contact carrier of said bandoleer, at least one wire to be crimped to each electrical contact included within said contact carrier, said tool comprising:

a trigger;

cam means coupled to said trigger;

a plurality of valves, said cam means for sequentially activating said valves, said valves for coupling pressurized air to a corresponding output of each valve;

indexing means for advancing said bandoleer of contact carriers within said tool to align one of said contact carriers and said bandoleer to an ejectable position, said indexing means being coupled to one of said valves and responsive to pressurized air provided through said corresponding valve;

means for ejecting said electrical contact from said contact carrier positioned in said ejectable position, said electrical contact being disposed into a crimping position within said tool, said ejection means being coupled to one of said plurality of valves and responsive to pressurized air provided therethrough; and crimping means for crimping said electrical contact when in said crimping position, said wire being placed into said electrical contact before activation of said crimping means, said crimping means being coupled to one of said plurality of valves and responsive to pressurized air provided thereto, whereby activation of said trigger automatically advances one of said contact carriers, ejects an electrical contact from said advanced contact carrier and crimps said contact to said wire.

16. The hand-held tool of claim 15 further comprising locking means for locking said trigger into a predetermined position, said trigger when in said predetermined position being prohibited from activating said cam means and in turn said plurality of valves to thereby prohibit activation of at least one of said indexing means, ejection means and said crimping means.

17. The hand tool of claim 15 wherein said crimping means further comprises selector means for regulating the degree of crimping of said electrical contact according to the gauge of said electrical contact and wire to be crimped within said electrical contact.

18. The hand tool of claim 17 wherein said selector means for regulating the crimping of said electrical contact is comprised of a first means for regulating crimping of said electrical contact according to said gauge of said electrical contact and second means for regulating said crimping of said electrical contact according to a gauge of said wire to be crimped.

19. An improved method in an externally powered hand tool for crimping an electrical electrical contact within a contact carrier to a wire comprising the steps of:

advancing a bandoleer of contact carriers using external power, each contact carrier containing an ejectable electrical contact, until one of said contact carriers and electrical contact is in an ejectable position;

automatically ejecting said electrical contact from said contact carrier using external power when said contact carrier is disposed in said ejectable position, said electrical contact being ejected from said contact carrier into a crimping position;

placing the wire to be crimped into said electrical contact; and subsequently crimping said electrical contact onto said wire using external power in a manner regulated to accommodate the gauge of said wire and of said electrical contact.

* * * * *